(12) United States Patent  
Kirchner et al.

(10) Patent No.: US 9,122,282 B2  
(45) Date of Patent: Sep. 1, 2015

(54) MULTI-STAGE BACK PRESSURE REGULATORS AND ASSOCIATED DEVICES, SYSTEMS, AND METHODS

(71) Applicant: SKO FLO Industries, Inc., Woodinville, WA (US)

(72) Inventors: Mark W. Kirchner, Seattle, WA (US); Scott Steele, Everett, WA (US)

(73) Assignee: SKO FLO Industries, Inc., Woodinville, WA (US)

( * ) Notice: Subject to any disclaimer, the term of this patent is extended or adjusted under 35 U.S.C. 154(b) by 68 days.

(21) Appl. No.: 13/938,170

(22) Filed: Jul. 9, 2013

(65) Prior Publication Data

US 2014/0007953 A1   Jan. 9, 2014

Related U.S. Application Data

(60) Provisional application No. 61/669,589, filed on Jul. 9, 2012.

(51) Int. Cl.
*F16K 31/12* (2006.01)
*G05D 16/06* (2006.01)

(52) U.S. Cl.
CPC ............ *G05D 16/06* (2013.01); *G05D 16/0655* (2013.01); *Y10T 137/7764* (2015.04); *Y10T 137/7795* (2015.04)

(58) Field of Classification Search
CPC .................................................. G05D 16/0602
USPC .................... 137/488, 489, 500, 503, 505.12, 137/515.13, 510, 512.3, 613
See application file for complete search history.

(56) References Cited

U.S. PATENT DOCUMENTS

| | | | | |
|---|---|---|---|---|
| 2,057,150 | A * | 10/1936 | Kehl et al. | 137/505.12 |
| 3,483,884 | A * | 12/1969 | Sullivan | 137/215 |
| 3,709,242 | A | 1/1973 | Chase | |
| 5,762,086 | A * | 6/1998 | Ollivier | 137/1 |
| 5,787,925 | A * | 8/1998 | Ollivier | 137/489.5 |
| 8,375,983 | B2 * | 2/2013 | Niebel | 137/503 |
| 2004/0011411 | A1 | 1/2004 | Thordarson et al. | |
| 2006/0026947 | A1 | 2/2006 | Poitout | |
| 2008/0011355 | A1 | 1/2008 | Bell et al. | |
| 2008/0015504 | A1 | 1/2008 | Boehringer et al. | |
| 2009/0235993 | A1 * | 9/2009 | Sugata et al. | 137/512 |

OTHER PUBLICATIONS

International Search Report and Written Opinion; International Patent Application No. PCT/US2013/049807; Applicant: SKO FLO Industries, Inc..; Mailed: Dec. 17, 2013; 10 pages.

* cited by examiner

*Primary Examiner* — Craig Schneider
*Assistant Examiner* — R. K. Arundale
(74) *Attorney, Agent, or Firm* — Perkins Coie LLP (57) ABSTRACT

Multi-stage back pressure regulators are disclosed herein. In one embodiment, a multi-stage back pressure regulator includes a first stage and a second stage downstream from the first stage. The first stage includes a gas-charged regulator device arranged to receive a fluid at an inlet, and the second stage includes a spring-loaded regulator device having an outlet in fluid communication with the inlet. The gas-charged regulator and the spring-loaded regulator are configured to control inlet pressure to the back pressure regulator and maximum differential pressures across the first and second stages.

24 Claims, 10 Drawing Sheets

MULTI-STAGE BACK PRESSURE REGULATORS AND ASSOCIATED DEVICES, SYSTEMS, AND METHODS

TECHNICAL FIELD

The present technology is related to back pressure regulators, and more particularly to multi-stage back pressure regulators configured for regulating a pressure differential between an inlet port and an outlet port.

BACKGROUND

Figure 1:
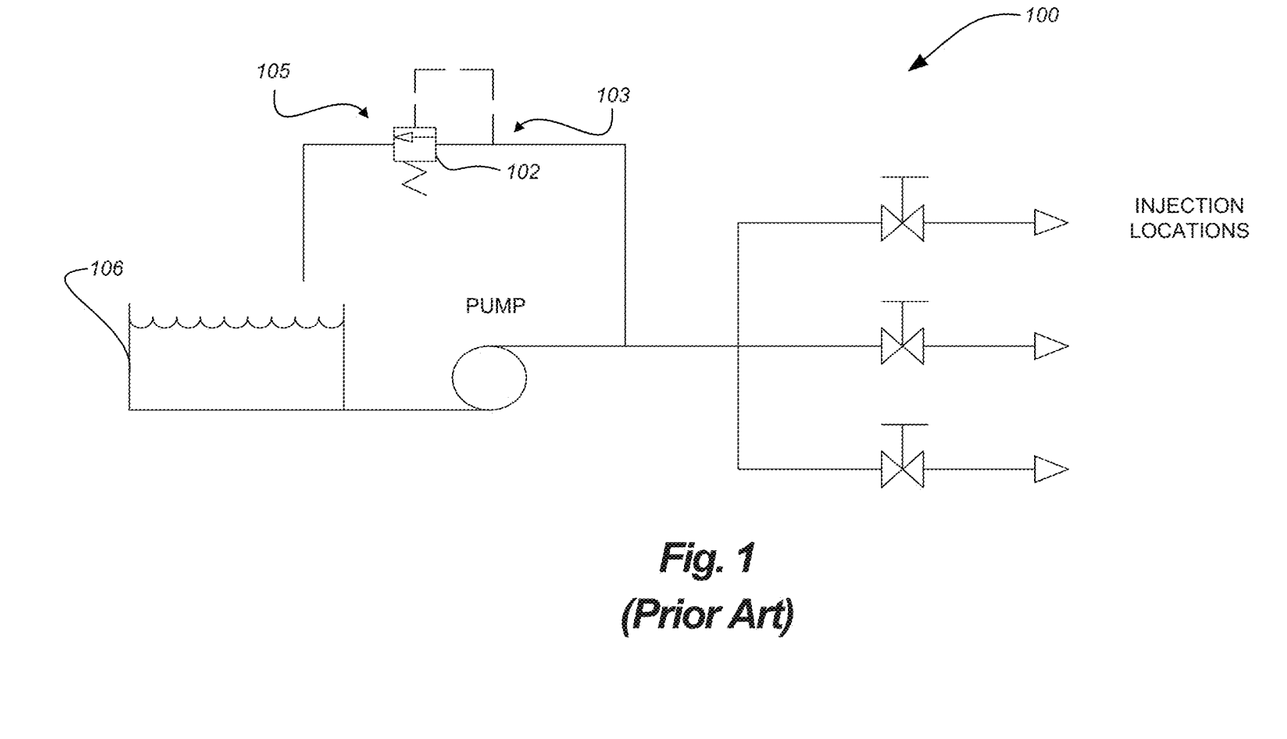
FIG. 1 is schematic illustration of a system with a back pressure regulator used as a spill off device in accordance with the prior art.

Back pressure regulators have been commercially available for decades. As the name implies, they regulate back pressure in a fluid system and are commonly used to serve as a relief valve or constant spill off device to limit excess pressure to a desired operating pressure range. For example, FIG. 1 shows a system 100 that includes a back pressure regulator 102 having an inlet 103 and an outlet 105. The regulator 102 reduces pressure by delivering fluid from the inlet 103 to a supply reservoir 106 at the outlet 105. The outlet 105 is typically at atmospheric pressure, while the inlet 103 is at an elevated pressure. A significant drawback in conventional back pressure regulators is cavitation conditions that can occur when there is a large pressure differential (e.g., 1,000 pounds per square inch (psi)) between the inlet 103 and the outlet 105. Cavitation conditions occur when fluid velocities are fast enough to cause the pressure at the velocity point to drop below the vapor pressure of the liquid. When pressure in the liquid drops below the liquid vapor pressure it creates a collapsing bubble and the pressure is recovered downstream of the choking point where the fluid slows down. This collapsing bubble can cause a point pressure load of up to approximately 300,000 psi on valve surfaces. This high contact pressure also causes an instantaneous heating at the collapsing bubble. The high heat and high contact pressure can erode the throttle surface.

High pressure differential can also cause other problems, such as high frequency flow noises that reverberate throughout a piping system. These noises can be extremely loud and may, in some cases, require installing noise suppression systems to meet safety standards. Another problem with conventional back pressure regulators is that the can include internal components that work against one another. For example, U.S. Patent Application No. US2010/0206401 discloses a two stage device with the second stage governing the pressure drop across the first stage. The second stage balances two different pressures inside the regulator against the pressure outside of the regulator over a bound area to create a force that governs the pressure differential across the first stage. A spring governs the pressure drop across the stage upstream of it. Flow passes through the second stage by going around a throttling pin then through the throttling seat. In this arrangement, a spike in inlet pressure will cause the second stage piston to drive towards the seat causing unstable pressure regulation. When two or more of these devices are installed in parallel, they can fight each other without external pressure spikes causing this effect. Accordingly, there is a need for back pressure regulators that can operate under high pressure differentials without causing cavitation and excessive reverberation.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. In addition, directional terms, such as "above," "below," "lower," "front," "back," "vertical," and "horizontal," may be used herein to express and clarify the relationship between various elements. It should be understood that such terms do not denote absolute orientation.

DETAILED DESCRIPTION

Specific details of several embodiments of the present technology are directed to multi-stage back pressure regulator devices, systems, and methods of operation configured to maintain a substantially constant inlet pressure, notwithstanding changes in flow rate through the device. Such devices can operate with large pressure differentials across the back pressure regulator without encountering substantial cavitation. For example, such devices can operate a pressure differential of several thousand to ten thousand or more psi pressure drop across the device.

Figure 2:
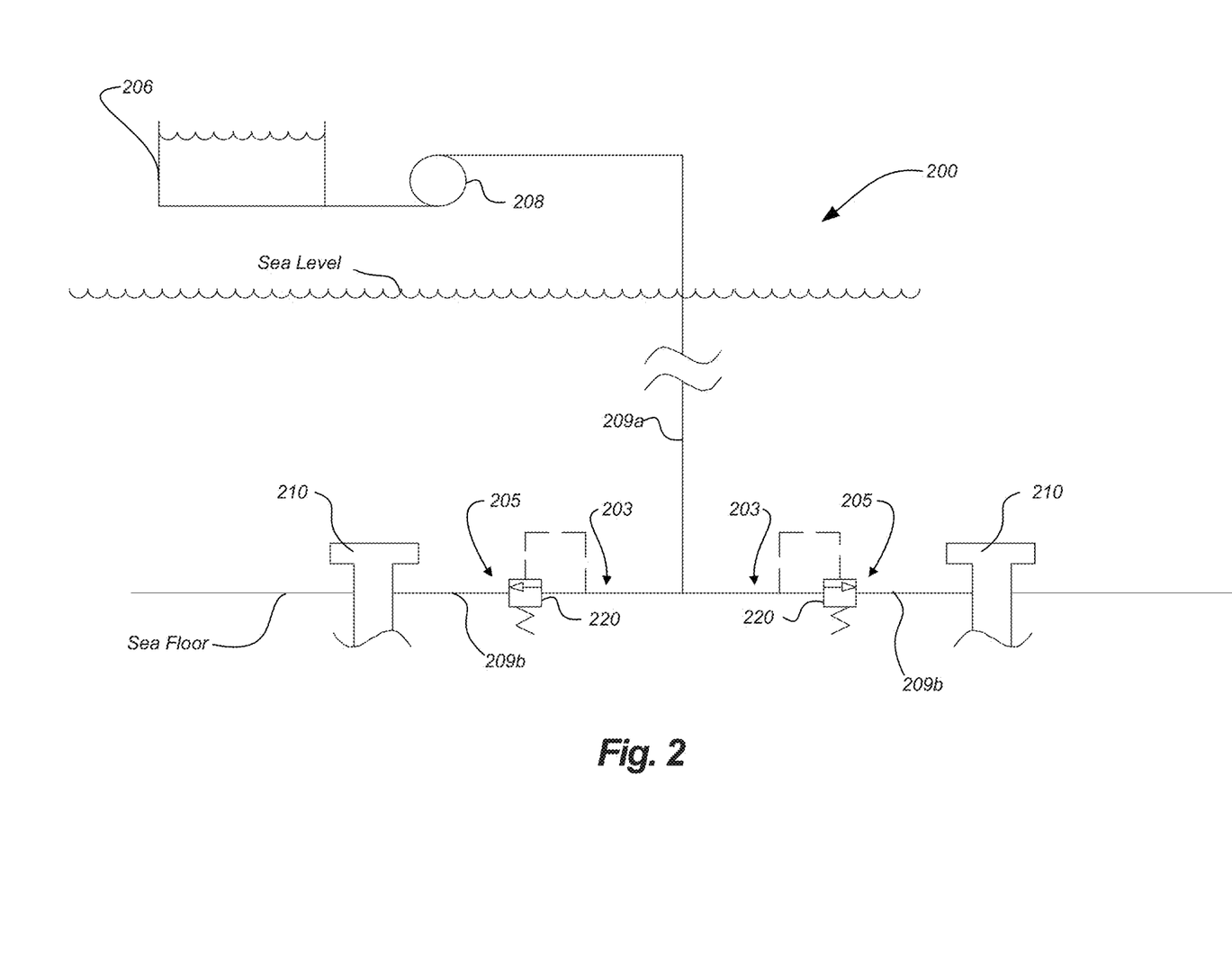
FIG. 2 is a schematic illustration of a system including multi-stage back pressure regulators configured in accordance with an embodiment of the present technology.

FIG. 2 is a schematic illustration of a system 200 configured in accordance with an embodiment of the present technology. In the illustrated embodiment, the system 200 includes two multi-stage back pressure regulators ("back pressure regulators 220") in a parallel configuration and arranged at a sea floor. The system also includes a pump 208 and fluid delivery lines 209 (identified individually as first and second fluid delivery lines 209a and 209b), such as pipes, hoses, conduits, fluidly coupling an inlet 203 of each of the back pressure regulators 220 to the pump 208. As shown, the fluid delivery lines 209 also fluidly couple an outlet 205 of each of the regulators 220 to a subsea oil well 210. In operation, the pump 208 delivers a fluid from a supply reservoir 206 to the back pressure regulators 220. Each of the back pressure regulators 220, in turn, directs the fluid out of its outlet 205 for delivery to the well head 210. In some embodiments, the fluid can include hydrate, ashphaltine, scale, wax, and other corrosion inhibitors.

In one aspect of this embodiment, each of the back pressure regulators 220 is configured to maintain a constant pressure at the inlet side 203 of the back pressure regulators 220. As described in greater detail below, the back pressure regulators 220 are configured to, inter alia, eliminate cavitation effects across the regulator device. In various embodiments, the system 200 is suited for delivering the fluid from offshore oil production platforms for low well pressure in deep water conditions. For example, because the hydrostatic head of the upstream fluid in the first fluid delivery line 209a can be substantially larger than the low pressure at the well heads 210 (i.e., the pressure at the second fluid delivery line 209b), the pressure difference can cause the fluid to have large transient pressure changes, which can ordinarily cause substantial cavitation conditions in some conventional systems.

In another aspect of this embodiment, the back pressure regulators 220 are configured to have an internal pressure reference (i.e., a pressure set point) independent of the water pressure at the sea floor. In one embodiment, the internal pressure reference is set to a threshold of 5,000 psi or greater. That is, the back pressure regulators 220 do not use the water pressure as a pressure reference. In various embodiments, the regulator devices also eliminate siphoning effects, such as those that can occur when injecting fluids into deep water wells that have low well pressure.

In a further aspect of this embodiment, the back pressure regulators 220 are configured to mitigate noise. As described in greater detail below, by extending the allowable pressure differential across internal regulators within the individual regulators 220, the back pressure regulators 220 can also reduce and/or eliminate the noise emitted from their internal valves due to cavitation. Accordingly, in certain embodiments, the system 200 can deliver the fluid without an intermediary baffle or sound suppression device upstream from the back pressure regulators 220 (e.g., at the sea level surface) to mitigate noise experienced in some conventional systems.

Although shown with a single back pressure regulator 220 at each well head 210 (i.e., at each injection point), in certain embodiments two or more back pressure regulators 220 can be positioned in series and/or parallel to inject fluid at each of the individual well heads 210. For example, multiple back pressure regulators 220 can be used to optimize or maximize fluid flow rate. In various embodiments, the individual back pressure regulators 220 can maintain a pressure set point of the fluid with a flow ranging from merely drops per minute to over fifty gallons per minute and with pressure drops in the range of, but not limited to, approximately 300 psi to over 15,000 psi across the valve.

Figure 3A:
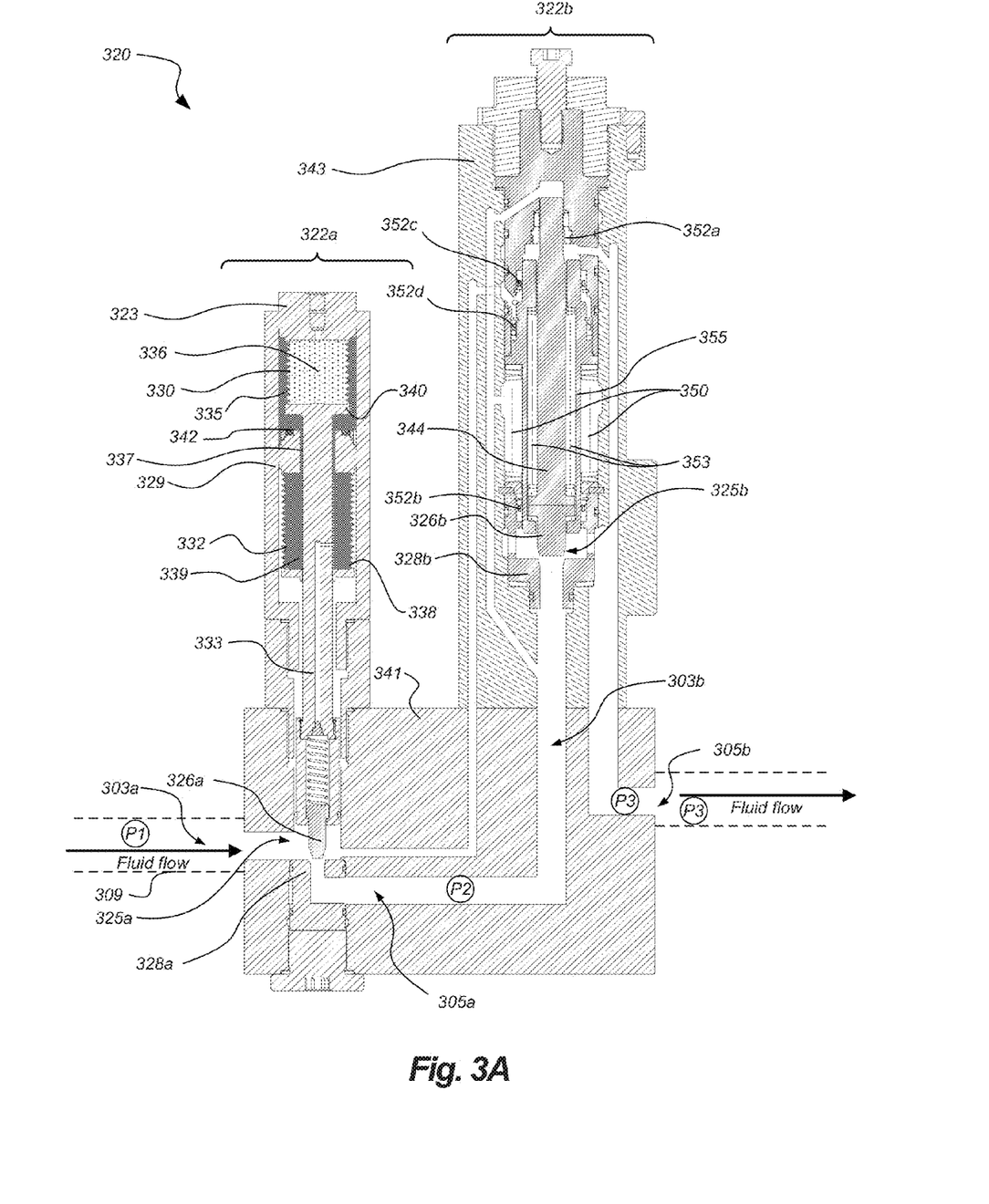
FIG. 3A is cross-sectional view of a two-stage back pressure regulator configured in accordance with an embodiment of the present technology.
Figure 3B:
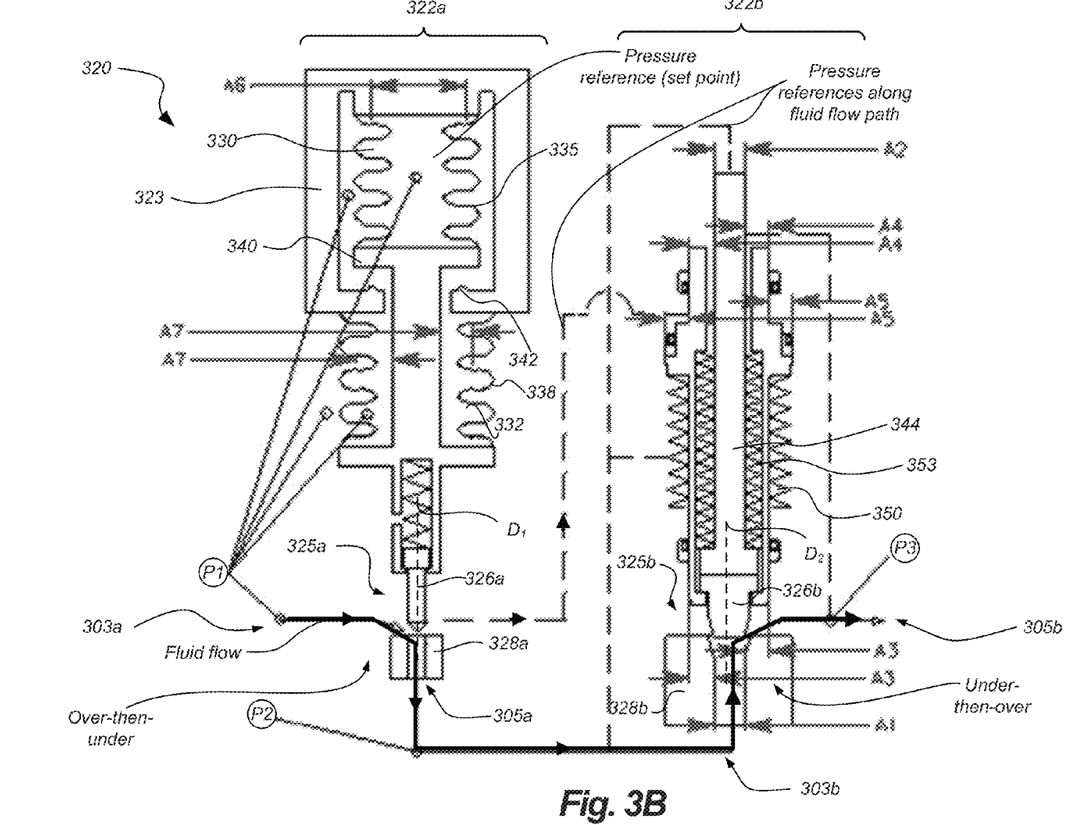
FIG. 3B is a schematic representation of the back pressure regulator of FIG. 3A.

FIG. 3A is cross-sectional view of a two-stage back pressure regulator 320 configured in accordance with an embodiment of the present technology. FIG. 3B is a schematic representation of the back pressure regulator 320. Referring to FIGS. 3A and 3B together, the back pressure regulator 320 includes a first stage 322a (i.e., primary stage) and a second stage 322b (i.e., a secondary stage). The first stage 322a includes a gas-charged, back pressure regulator device ("gas-charged regulator device 323") having an inlet 303a, an outlet 305a, and a valve 325a in a fluid flow path between the inlet 303a and the outlet 305a. The valve 325a includes a throttling pin 326a (or mating cone) and a seat 328a arranged to receive the throttling pin 326a. In the illustrated embodiment, the throttling pin 326a and the seat 328a are arranged to provide trim in an "over-then-under" configuration in which fluid flows transverse to an axial direction $D_1$ of the throttling pin 326a. That is, fluid flows laterally (toward the right-hand side of the page) against the throttling pin 326a and then downward (toward the bottom of the page) beneath the throttling pin 326a en route to the outlet 305a.

The gas-charged regulator device 323 further includes a housing 329 containing a gas-charged bellows 330, an isolation bellows 332, and a shaft or rod 333 operably coupling the gas-charged bellows 330 and the isolation bellows 332 to the throttling pin 326a. The gas-charged bellows 330 includes a flexible membrane 335 and a gas 336 (e.g., nitrogen) contained within the flexible membrane 335. As described in greater detail below, the gas 336 can be pressurized within the flexible membrane 335 to provide a reference pressure independent of the pressure external of the back pressure regulator, such as the hydrostatic pressure at a subsea well head. The isolation bellows 332 of the illustrated embodiment includes a flexible membrane 338 sealed within the housing 329 to define an enclosure that holds a substantially non-compressible containment fluid 339 (e.g., silicon oil) around the exterior of the membrane 335 of the gas-charged bellows 330. The shaft 333 includes a mating seat or shoulder 340 coupled to the gas-charged bellows 330 and configured to abut against a resilient bumper 342 of the housing 329 under low operating pressures at the inlet 303a.

The second stage 322b of the back pressure regulator 320 includes a spring biased regulator 343 having an inlet 303b, an outlet 305b, a spring biased shaft or rod 344, and a valve 325b operably coupled to the shaft 344 and in fluid communication with the outlet 305a of the gas-charged regulator device 323. As shown, the valve 325b includes a mating cone (or throttling pin) 326b and a seat 328b arranged to receive the mating cone 326b. In the illustrated embodiment, and in contrast to the valve 325a, the mating cone 326b and the seat 328b are arranged to provide trim in an "under-then-over" configuration in which fluid flows generally in parallel with an axial direction $D_2$ of the mating cone 326b. That is, fluid flows upward from under the mating cone 326b (toward the top of the page), past the mating cone 326b, and then laterally over the seat 328b (toward the right-hand side of the page) en route to the outlet 305b.

In the illustrated embodiment, the first stage gas-charged regulator device 323 and the second stage spring-loaded regulator 343 are integrated into and fluidly connected by a fluid delivery block 341 (e.g., a die-cast block). In other embodiments, the second stage spring-loaded device can be operably connected to the first stage using other types of fluid connections, piping, conduit, etc.

In operation, and as best seen in FIG. 3B, a pressure level P1 in the first stage 322a is regulated by the balance of a mechanism that exerts a substantially constant force over the stroke of the throttling pin 326a that mates with the seat 328a. This force can be provided by the gas charged flexible membrane 335 contained by the area A6. The maximum pressure drop that this first stage 322a dissipates is regulated by a second stage 322b, which functions as a differential pressure regulator for pressure drops across the first stage 322a. In some embodiments, other types of regulators can be used in lieu of the gas-charged regulator device 323 at the first stage 322a, including, for example, a spring-loaded regulator device (see, e.g., FIGS. 5A and 5B).

As discussed above, the flexible membrane 335 of the gas-charged bellows 330 is surrounded by the containment fluid 339 at the same pressure level as the pressure level P1 at the inlet 303a. When the pressure level P1 is equal to or greater than the gas charge pressure in the flexible membrane 335, the mating seat 340 will not contact the resilient bumper 342. When fluid pressure at the inlet 303a drops below the pressure of the gas charge in the gas-charged bellows 330, the mating seat 340 will contact the resilient bumper 342 to lock in pressure around the flexible membrane 335. This locked in pressure provides very low pressure drop across the flexible membrane 335 to allow the use of flexible low differential pressure strength bellows designs.

The containment fluid 339 of the isolation bellows 332 is a clean fluid and isolates dirty fluid from the resilient bumper 342 (which prevents mechanical degradation of the passageway within the resilient bumper 342 caused by debris in the dirty fluid). In the illustrated embodiment, the area A7 is substantially equal to the area A6 of the gas-charged bellows 330. The equality of pressure in these two bellows 330 and 332 provides low stress on both of them because the pressure difference across the bellows 330 and 332 is not stroke dependent with this balanced area. In general, the resilient bumper 342 and the mating seat 340 can form a tight seal to prevent the containment fluid 339 from dripping through a passageway 337 in certain low pressure scenarios that could potentially damage the flexible membranes 335 and 338. For example, the inlet pressure can fall below the gas charged pressure during transport to and from a subsea location or if the flow rate fed to the back pressure regulator 320 is too low for the first stage to regulate pressure to the gas charge set point. If the bumper and seat are not tightly sealed, the gas charge could yield and/or rupture the membranes 335 and 338.

The second stage 322b of the back pressure regulator 320 includes five bound areas A1 through A5 with pressures that react on the shaft 344 in the axial direction. The areas A1 through A4 and the corresponding pressures in the areas A1 through A4 cancel out in the direction of net axial force with a fifth area A5 balanced by one or more springs 350 positioned to govern a difference in pressure across the area A5. This pressure drop governance limits the pressure drop across the first stage 322a The area A1 is bound by the throttling area of the seat 328b and mating cone pin 326b and is balanced by the area A2 bound by a first cup or dynamic seal 352a (FIG. 3A), with both the areas A1 and A2 being substantially equal and having communicated pressure level P2 applied in opposite directions. The area A3 is bound by a second cup or dynamic seal 352b and the throttling area of the seat 328b and the mating cone 326b and is balanced by the area A4 bound by the first cup or dynamic seal 352a and a third cup or dynamic seal 352c, with both areas being substantially equal and having communicated pressure level P3 applied in opposite directions. The area A5 is bound by the third cup or dynamic seal 352c and a fourth cup or dynamic seal 352d and has pressure level P1 applied to one side and pressure level P2 and the force of a biasing member 353 applied to the opposite side. The biasing member 353 and the balanced pressure forces across area A5 governs the pressure drop across the mating cone 326b and the seat 328b.

The second stage 322b can achieve precise alignment between the mating cone 326b and the seat 328b through the shaft 344 mating against the mating cone 326b and with the shaft 344 balancing the seat to cone area with the same pressures applied to each end effectively balancing the design. One or more biasing members 353, such as one or more springs, can be configured to overcome cup seal drag from cup or dynamic seals 352a-d to maintain contact between the shaft 344 and the mating cone 326b. The mating cone 326b of the illustrated embodiment is radially supported by a piston 355 and axially supported with the shaft 344 that is biased by biasing members 353.

To accomplish this self-dampening feature with a series of throttling trims activated by spring and pressure balanced areas, flow is directed to the underside of the mating cone 326b that mates with the seat 328b. For example, when fluid flow enters the first stage 322a with a pressure of approximately 10,000 psi, and a flow rate between 0.1 to 30 gpm, the first stage 322a can be configured such that the pressure drop across the first and second valves 325a and 325b (pressure level P1 to pressure level P3) is approximately 6,500 psi with the first stage 322a consuming approximately a 3,000 psi drop and the second stage 322b consuming a 3,500 psi drop. As a result of these regulated drops, pressure level P2 will be 7,000 psi and pressure level P3 will be 3,500 psi.

In general, the back pressure regulator 320 is configured to regulate the lowest pressure that the pressure at the inlet 303a can fall to. In the illustrated embodiment, this minimum pressure threshold, $P_{Min}$ is set by the set point pressure of the gas charge bellows 330 of the gas charge regulator 323. When the absolute pressure at the inlet falls below the threshold pressure $P_{min}$ the first stage 322a of the back pressure regulator 320 will become active. For example, if the back pressure regulator 320 is configured to regulate the inlet pressure to a 5000 psi minimum, the first stage 322a will not be active until the differential between the inlet 303a pressure and the outlet 305b pressure fall to near 5000 psi. The second stage 322b regulates the maximum differential pressures across the first stage 322a. The second stage 322b starts to regulate when the drop across the first stage 322a exceeds a pressure drop set by the spring tension member 350 and area A5 (in the various embodiments that include more than two stages, each stage regulates the maximum pressure differential in a similar manner across the stage immediately upstream to it). The pressure differential across the first stage 322a (or an upstream stage) can be approximated by Equation 1.

$$\Delta P_{up} = P_{inlet} - \Delta P_{down} - P_{outlet} \tag{1}$$

where $\Delta P_{up}$ is the pressure differential across an upstream stage, $P_{inlet}$ the pressure at the inlet to the upstream stage, $\Delta P_{down}$ is the pressure differential across the downstream stage, and $P_{outlet}$ is the pressure at the outlet of the downstream stage. As another example, if $P_{Min}$ is set to 5,000 psi (by, e.g., a gas charge at 5000 psi), the pressure differential $\Delta P_{down}$ across the second stage is set to a maximum of 2700 psi, and the outlet pressure $P_{outlet}$ at the outlet 305b is at 300 psi, the pressure differential $\Delta P_{up}$ across the first stage will have a maximum pressure differential of 2,000 psi.

As discussed above, one advantage of the back pressure regulator 320 is that it does not require an external pressure reference source. In deep water applications, conventional back pressure regulators typically use the hydrostatic pressure as a pressure reference source. The gas-charged regulator device 323, however, is not required to be in fluid communication with the sea water. In other embodiments, however, a back pressure regulator can employ hydrostatic pressure as a pressure reference.

Another advantage of the back pressure regulator 320 is that the regulated pressure differentials of the first and second stages 322a and 322b evenly distribute fluid erosion across both trims. A conservative rule in valve design regarding pressure differentials is that if the drop across a trim of similar geometry shown in the figures is greater than the pressure downstream of the trim, the trim will not make auditable noise that can be transmitted via air born noise radiating from the valve or flow lines. This noise is the start of the trim entering a cavitation condition. If this radiated noise is great enough, noise suppression systems must be installed with the valve to comply with safety standards. If the second stage 322b was not present, the first stage 322a would see approximately 6,500 psi pressure drop, which is 3000 psi greater than the outlet pressure, and the valve would, therefore, make noise and experience potentially destructive cavitation.

Figure 4:
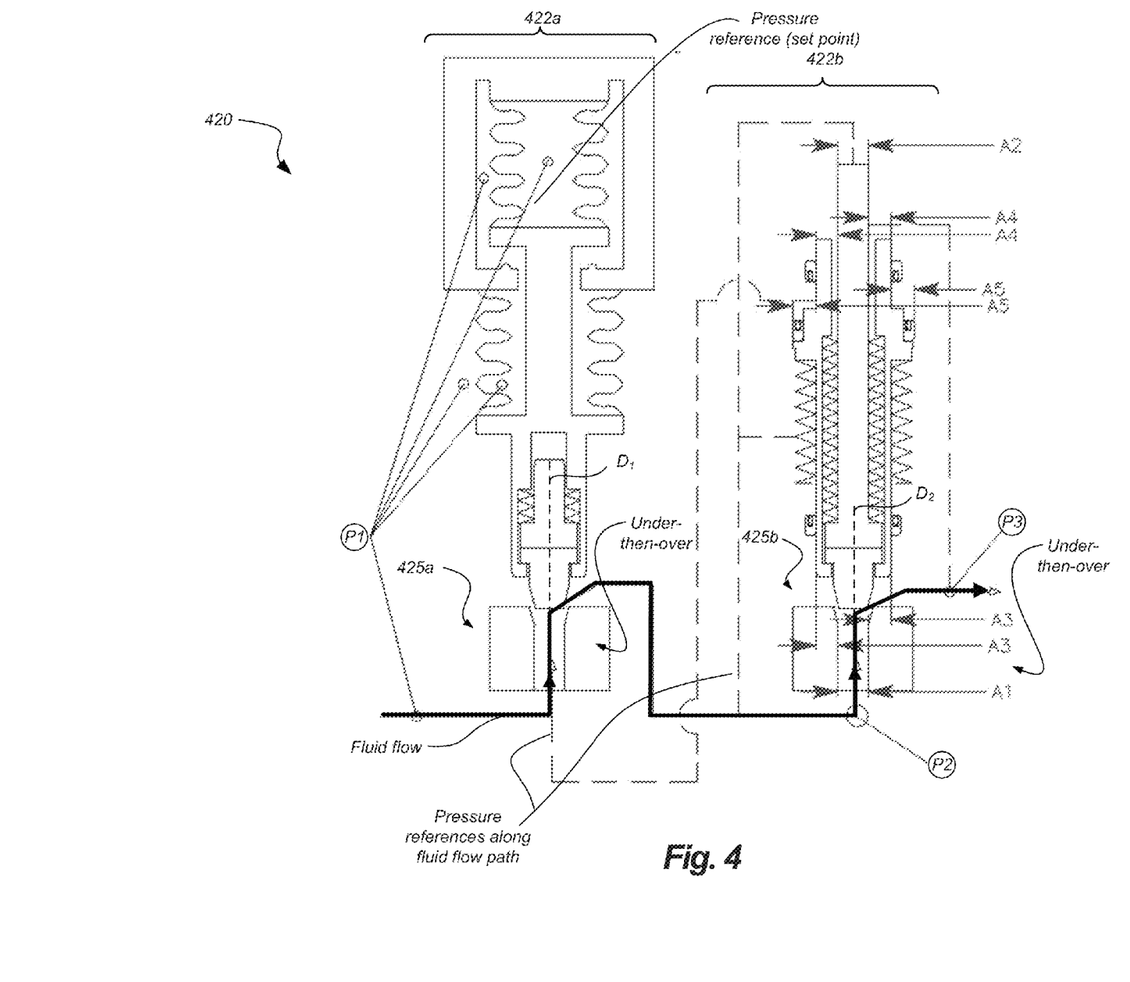
FIG. 4 is a schematic representation of an alternative configuration of the back pressure regulator of FIG. 3A in which a similar valve configuration is used and the first stage has an "under-then-over" fluid flow path.

A further advantage of the back pressure regulator 320 is that the arrangement of the over-then-under trim of the valve 325a in the first stage and the under-then-over trim of the valve 325b in the second stage can mitigate or eliminate shaking/resonance conditions that might ordinarily occur in fluid delivery line 309. For example, conventional spring-loaded valves without such an alternating arrangement of trim (having, e.g., only under-then-over configurations) can resonate or shake when they are connected to long sections of small diameter rigid steel lines in series or parallel installations without dampening systems that operate to dissipate pressure pulsations (e.g., gas charged accumulators, flexible hose systems, etc.). Without being bound by theory, it is believed that having two or more over-then-under configurations in series without an under then over configuration between them will cause an unstable condition where the stages in series will resonate without sufficient fluid and/or mechanical dampening. This unstable condition is exacerbated if a second assembly (containing a primary and secondary stage and/or third stage) is connected in parallel with it. The instability of two over then under stages in series is caused by a pressure spike on the inlet to the valve causing the second stage to drive shut if the second stage is piloted too close to limit the pressure drop across the first stage. If the second stage is an under then over design it will be retarded from rapid closure because a rapid closure of the second stage stem would cause a pressure spike on the bottom of the cone which in turn would slow the closing action of the second stage stem that mates with the second stage seat. Spring member 353 will further relieve any pressure spike between the first and second stage if the pressure spike is greater than the area of the seat times the preload of the spring 353. In other embodiments, however, a back pressure regulator can include different trim configurations. FIG. 4, for example, illustrates a two-stage back pressure regulator 420 in accordance with an alternative embodiment having valves 425a and 425b in an under-then-over configuration at both stages. In some embodiments, this type of configuration can be selected where the pressure differential across each stage is not expected to create substantial amounts of resonance.

Figure 5A:
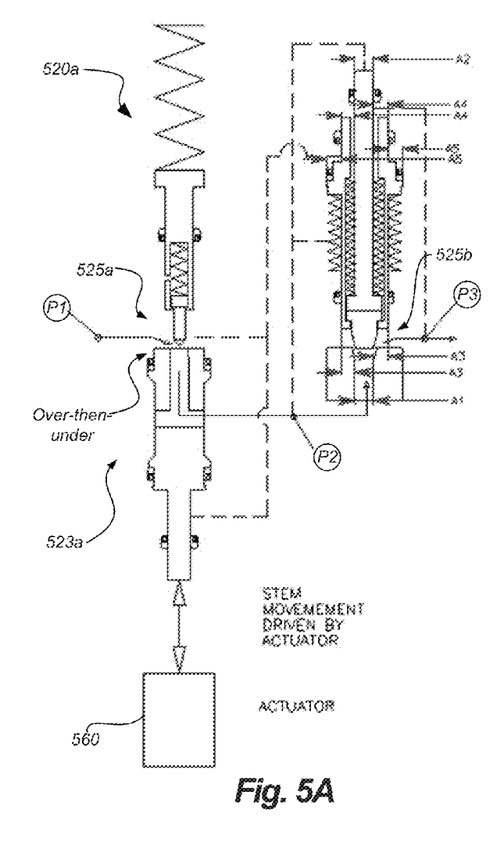
FIG. 5A is a schematic representation of an alternative configuration of the back pressure regulator of FIG. 3A employing a separate actuator in accordance with an embodiment of the present technology.
Figure 5B:
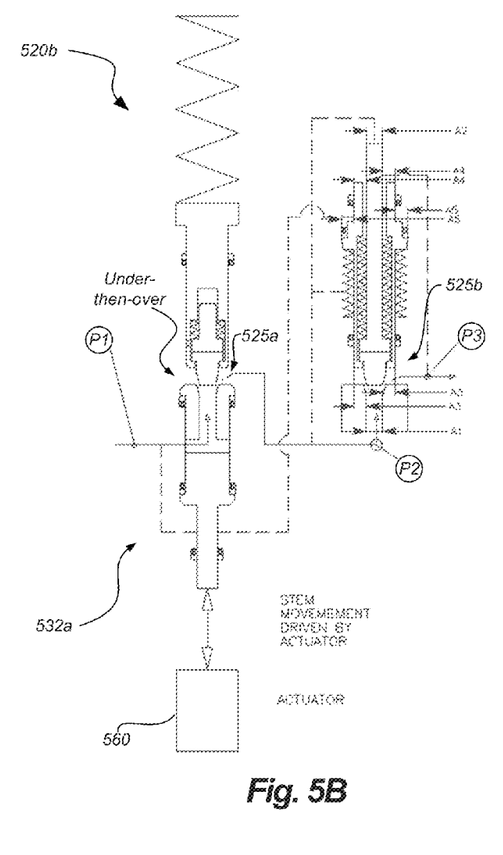
FIG. 5B is a schematic representation of an alternative configuration of the back pressure regulator of FIG. 5A.

Yet another advantage of the back pressure regulator 320 is that it employs passive devices that do not require externally powered actuators (e.g., solenoid powered actuators) to provide regulation. Rather, each stage automatically engages when the upstream pressure rises above a threshold pressure level. Accordingly, the back pressure regulator 320 does not require separate signal delivery lines for powering or energizing components, nor does the back pressure regulator regulate the pressure at the inlet to the device until a low pressure threshold is reached. In some embodiments, however, one or more of internal regulator devices (e.g., a spring-loaded regulator) can work in combination with a separate actuator. FIG. 5A, for example, illustrates a multi-stage regulator 520a having a separate actuator 560 (e.g., a solenoid device) connected to a spring-loaded regulator device 523a. FIG. 5A also shows an alternative configuration in which the spring-loaded regulator device 523a is used in lieu of a gas-charged regulator device and the valves 525a and 525b are both in an under-then-over configuration. FIG. 5B illustrates another alternative configuration of a multi-stage regulator 520b which is similar to FIG. 5A, except the valve 525a of the spring-loaded device 523b is an under-then-over configuration.

In addition to the above-described advantages and features, back pressure regulators configured in accordance with various embodiments of the present technology can include additional pressure dissipating stages downstream of the first stage. Each secondary stage can regulates the pressure to automatically limit the pressure differential across the stage immediately upstream. FIGS. 6A-7B, for example, show alternative configurations of multi-stage back pressure regulators 620 and 720, respectively, having a primary stage and two or more secondary stages. In general, the back pressure regulators 620 and 720 share the same principle of operation as the back pressure regulator 320 (FIGS. 3A and 3B). For example, the primary and secondary stages maintain a constant back pressure level P1 at an inlet of the back pressure regulator with changes in flow rate routed to through the regulator with the aid of either a gas charged volume or a spring balanced area bound by dynamic seals.

Figure 6A:
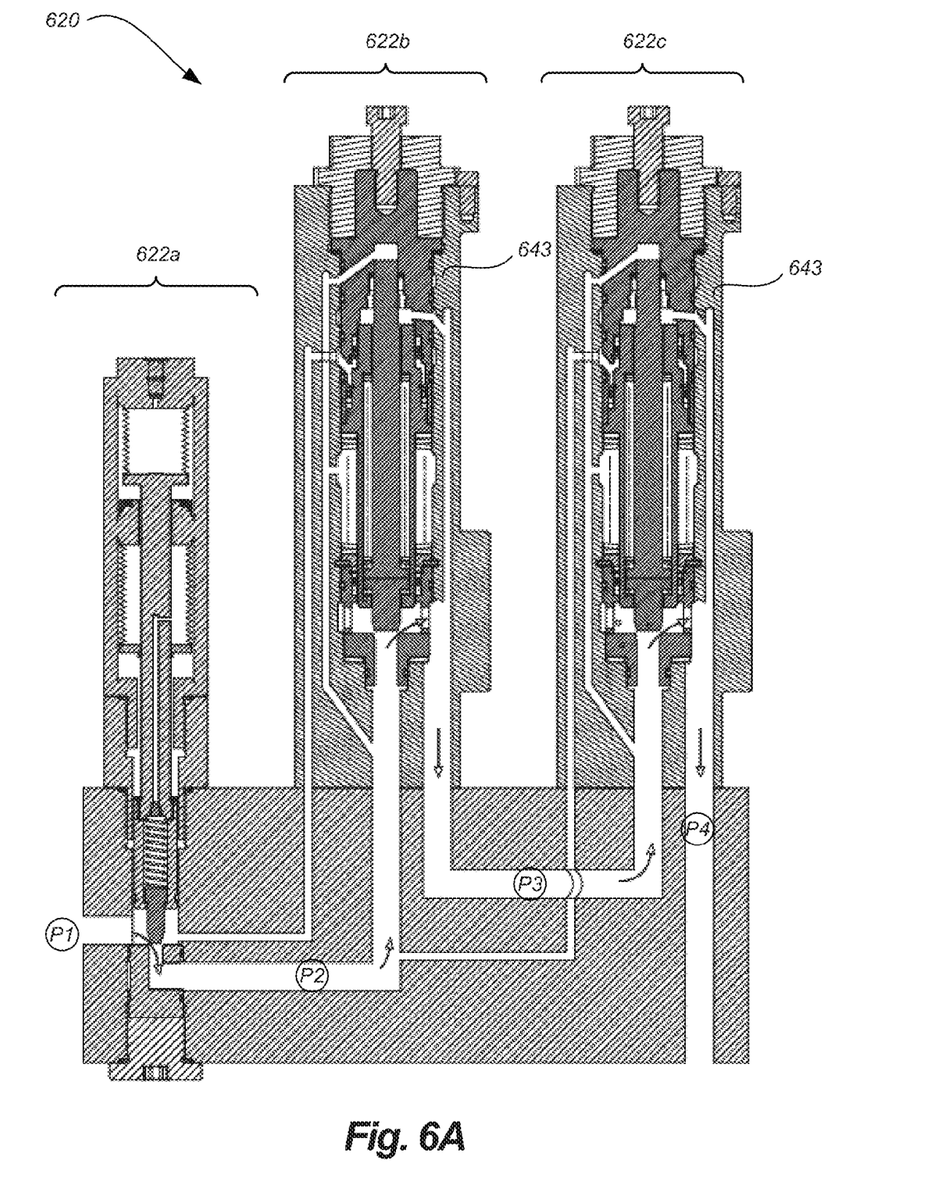
FIG. 6A is cross-sectional view of a three-stage back pressure regulator configured in accordance with another embodiment of the present technology.
Figure 6B:
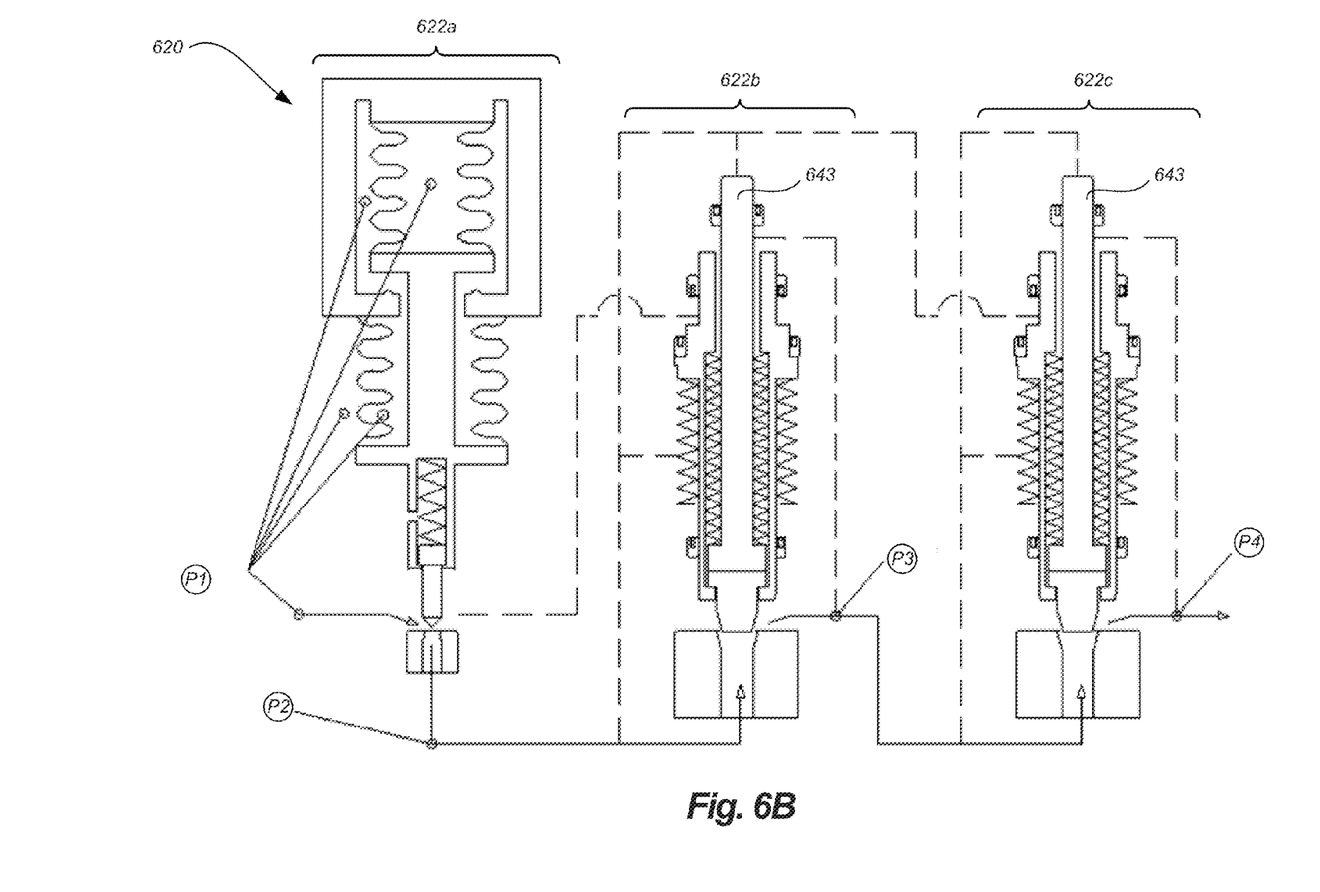
FIG. 6B is a schematic representation of the back pressure regulator of FIG. 6A.
Figure 7A:
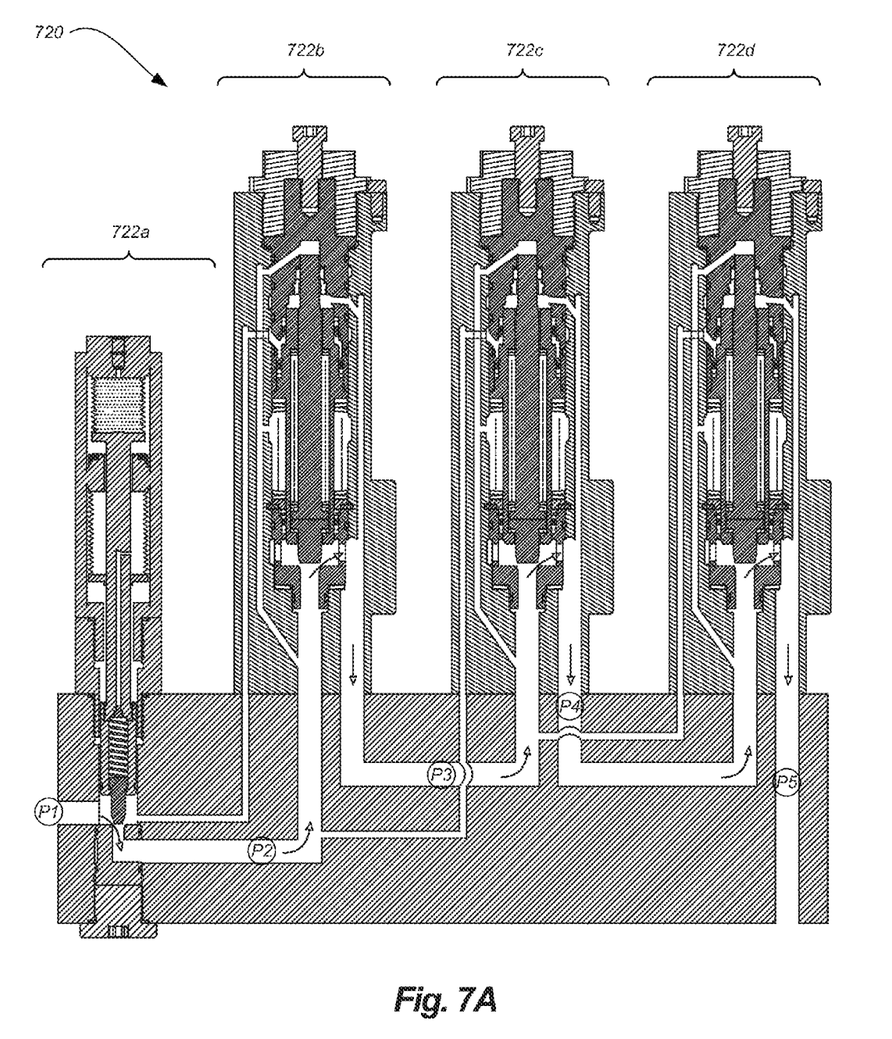
FIG. 7A is cross-sectional view of a four-stage back pressure regulator configured in accordance with a further embodiment of the present technology.
Figure 7B:
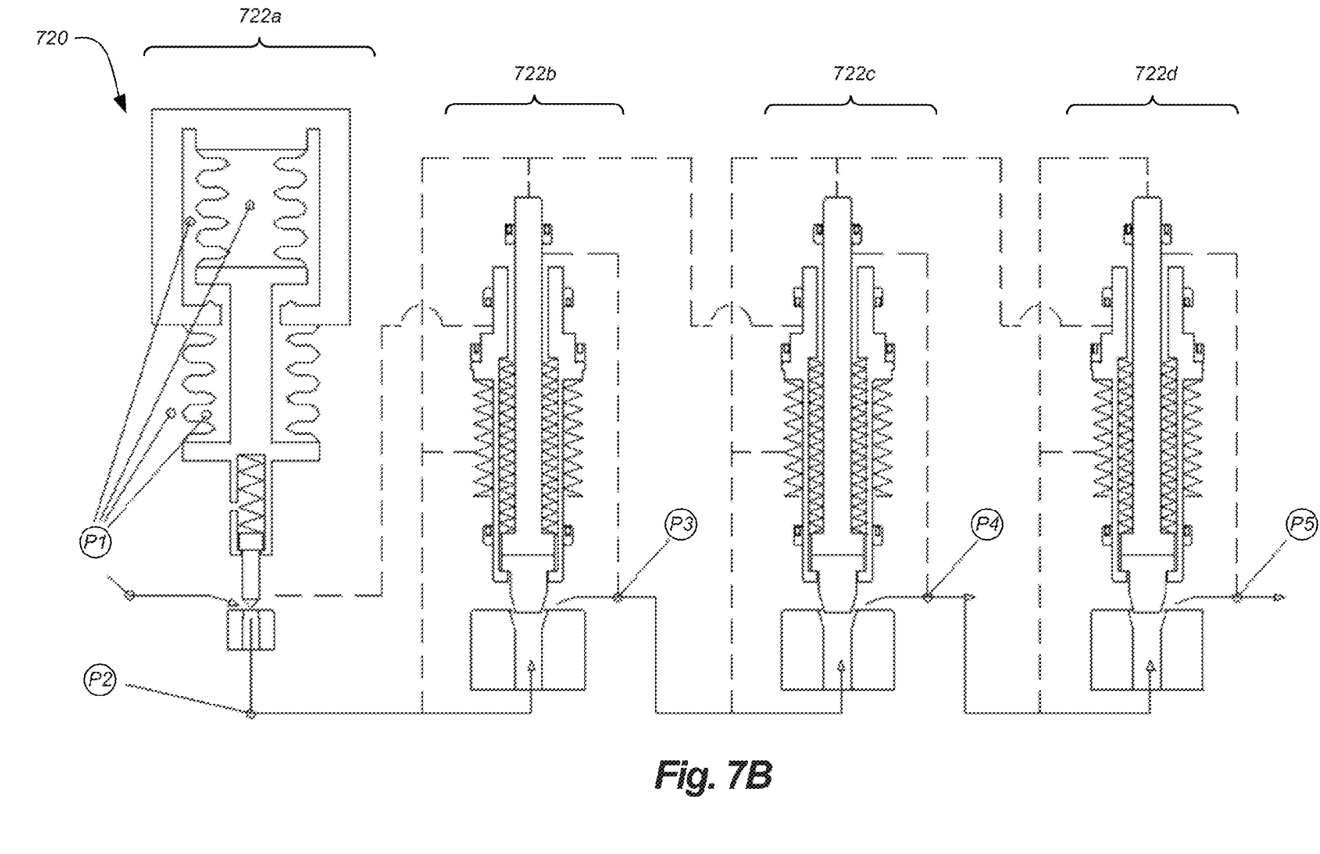
FIG. 7B is a schematic representation of the back pressure regulator of FIG. 7A.

Referring to FIGS. 6A and 6B, the back pressure regulator 620 can have first through third stages 622a-c. As pressure increases beyond a threshold at the first stage 622a, the second stage 622b begins to dissipate pressure, and at an even higher pressure differential, the third stage 622c will begin dissipating pressure when the second stage 622b is at or near its pressure threshold. For example, if the pressure drop across the second and third stages 622b and 622c (P3-P4) is 3,500 psi and the third stage 622c is set to regulate a 1,700 psi pressure drop, the outlet pressure level P4 could be as low as 1,800 psi with no cavitation noise radiated. In general, fluid systems with higher flow rates of thinner fluids (i.e., lower viscosity) over the same size valve trims can use additional stages. For example, the back pressure regulator 620 can dissipate the same pressure drop as a back pressure regulator 320 (FIG. 3) having lower flow rates and higher viscosity than the back pressure regulator 620. In some embodiments, the second and third stages 622b and 622c can employ spring-loaded regulators 643 that are substantially similar in structure and operation. As shown in FIGS. 7A and 7B, a back pressure regulator 720 can include four stages 722a-d in instances of a larger maximum pressure drop across each stage (relative to, e.g., the back pressure regulator 620 of FIG. 6). Other embodiments of the present technology can include more than four stages.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

We claim:
1. A multi-stage back pressure regulator, comprising:
 a first stage including a gas-charged regulator device having an inlet configured to receive a fluid, the gas-charged regulator device comprises a gas-charged bellows; and an isolation bellows positioned to separate the gas-charged bellows from the fluid; and
 a second stage including a spring-loaded regulator device having an outlet in fluid communication with the inlet, wherein the gas-charged regulator and the spring-loaded regulator are configured to direct the fluid to the outlet.

2. The multi-stage back pressure regulator of claim 1 wherein:
the gas-charged regulator device further comprises a first valve in fluid communication with the inlet; and
the spring-loaded regulator device comprises a second valve fluidly coupling the first valve with the outlet,
wherein the first valve has an over-then-under fluid flow path configuration and the second valve has an under-then-over fluid flow path configuration.

3. The multi-stage back pressure regulator of claim 1 wherein the gas-charged regulator device and the spring-loaded regulator devices are passive devices configured such that they do not regulate pressure when the fluid pressure at the inlet is greater than a threshold pressure level.

4. The multi-stage back pressure regulator of claim 3 wherein the threshold pressure level is 1,000 psi or greater.

5. The multi-stage back pressure regulator of claim 3 wherein the threshold pressure level is 5,000 psi or greater.

6. The multi-stage back pressure regulator of claim 1 wherein:
the gas-charged regulator device and the spring-loaded regulator device are configured to distribute a maximum fluid pressure differential across the back-pressure regulator;
the gas-charged regulator device distributes a first portion of the maximum pressure differential; and
the spring-loaded regulator device distributes a second portion of the maximum pressure differential.

7. The multi-stage back pressure regulator of claim 6 wherein the second portion of the pressure differential is greater than the first portion of the pressure differential.

8. The multi-stage back pressure regulator of claim 1 wherein:
the gas-charged regulator device and the spring-loaded regulator device are configured to distribute a fluid pressure differential across the back-pressure regulator; and
the gas-charged regulator device is configured to distribute the fluid pressure differential up to a threshold pressure level before the spring-loaded regulator device distributes any of the fluid pressure differential.

9. The multi-stage back pressure regulator of claim 1 wherein the gas-charged regulator device comprises a valve that configured to receive the fluid from the inlet, a shaft connected to the valve and coupled to the gas-charged bellows, wherein the gas-charged bellows is surrounded by an isolating fluid and is pressurized to define a reference pressure independent of ambient pressure in a surrounding environment, and wherein the isolation bellows is a flexible membrane between the valve and the gas-charged bellows.

10. The multi-stage back pressure regulator of claim 9 wherein the valve of the gas-charged regulator device is a first valve having an over-then-under fluid flow path configuration, and the second stage has a second valve in fluid communication with the outlet, wherein the second valve has an under-then-over fluid flow path configuration.

11. A multi-stage back pressure regulator, comprising:
a first stage including a gas-charged regulator device having an inlet configured to receive a fluid;
a second stage having a first spring-loaded regulator device having an outlet in fluid communication with the inlet; and
a second spring-loaded regulator device configured to receive the fluid from the gas-charged regulator and to provide the fluid to the first spring-loaded regulator;
wherein the gas-charged regulator and the spring-loaded regulator are configured to direct the fluid to the outlet.

12. The multi-stage back pressure regulator of claim 11 wherein:
the first spring-loaded regulator device is configured to distribute fluid pressure up to a first threshold pressure level; and
the second spring-loaded regulator device is configured to distribute fluid pressure up to a second threshold pressure level.

13. A system for back pressure regulation, comprising:
a passive first back pressure regulator device having a first inlet, a first outlet, and a first valve intermediate the first inlet and first outlet, and wherein the first valve includes a first throttling pin and a first seat arranged to receive fluid along an over-then-under fluid flow path, the passive first back pressure regulator comprises a gas-charged bellows connected to the first valve, the gas-charged bellows is surrounded by an isolating fluid and is pressurized to define a reference pressure independent of ambient pressure in a surrounding environment; and
a passive second back pressure regulator device fluidly coupled in series with the first back pressure regulator device and having a second inlet that receives fluid from the first outlet, a second outlet, and a second valve intermediate the second inlet and second outlet, and wherein the second valve includes a second throttling pin and a second seat arranged to receive fluid along an under-then-over fluid flow path.

14. The system of claim 13 wherein the first and second back pressure regulator devices are spring-loaded regulator devices.

15. The system of claim 13 wherein the first back pressure regulator is a gas-charged regulator device and the second regulator is a spring-loaded regulator device downstream from the gas-charged regulator device.

16. The system of claim 13, further comprising a passive third back pressure regulator device and a passive fourth back pressure regulator device arranged in series with one another and in parallel with the first and second passive back pressure regulator devices, wherein:
the passive third back pressure regulator device includes a third inlet that receives fluid from the second outlet, a third outlet, and a third valve intermediate the third inlet and third outlet having a third throttling pin and a third seat arranged to receive fluid along an under-then-over fluid flow path; and
the passive fourth back pressure regulator device includes a fourth inlet that receives fluid form the third outlet, a fourth outlet, and a fourth valve intermediate the fourth inlet and fourth outlet, and wherein the fourth valve includes a fourth throttling pin and a fourth seat arranged to receive fluid along an under-then-over fluid flow path.

17. The system of claim 13 wherein the first and second regulator devices are configured to be positioned at or near a sea floor.

18. The system of claim 13, further comprising a fluid delivery line fluidly coupling the first and second regulator devices with a pump without an intermediary baffle or sound suppression device upstream from the first regulator.

19. The system of claim 13 wherein the passive first back pressure regulator comprises the isolation bellows between the first valve and the gas-charged bellows, wherein at least a portion of the isolating fluid is contained within the isolation bellows.

20. A multi-stage back pressure regulator, comprising:
a first stage including a gas-charged regulator device having a first inlet configured to receive a fluid, a first outlet, and a first valve intermediate the first inlet and first outlet, and wherein the first valve arranged to receive fluid therethrough, and the gas-charged regulating device having a gas-charged bellows connected to the first valve, the gas-charged bellows being surrounded by an isolating fluid and pressurized to define a reference pressure independent of ambient pressure in a surrounding environment; and a second stage having a spring loaded regulator device fluidly coupled in series with the first stage, the spring loaded regulator device having a second inlet that receives fluid from the first outlet, a second outlet, and a second valve intermediate the second inlet and second outlet, wherein the second valve is arranged to receive fluid therethrough;

wherein the gas-charged regulator and the spring-loaded regulator are configured to direct the fluid to the second outlet.

21. The multi-stage back pressure regulator of claim 20 wherein the gas charged regulator comprises the isolation bellows between the first valve and the gas-charged bellows, wherein at least a portion of the isolating fluid is contained within the isolation bellows.

22. The multi-stage back pressure regulator of claim 20 wherein the gas-charged regulator and the spring-loaded regulator are passive devices configured such that they do not regulate pressure when the fluid pressure at the inlet is greater than a threshold pressure level.

23. A multi-stage back pressure regulator, comprising:

a first stage including a gas-charged regulator device having a first inlet configured to receive a fluid, a first outlet, and a first valve intermediate the first inlet and first outlet, and wherein the first valve arranged to receive fluid therethrough, and the gas-charged regulating device having a gas-charged chamber in communication with an isolating fluid and being pressurized to define a reference pressure independent of ambient pressure in a surrounding environment, and the gas-charged regulating device having an isolation bellows in direct communication with the isolating fluid and being between the first valve and the gas-charged chamber; and a second stage having a spring loaded regulator device fluidly coupled in series with the first stage, the spring loaded regulator device having a second inlet that receives fluid from the first outlet, a second outlet, and a second valve intermediate the second inlet and second outlet, wherein the second valve is arranged to receive fluid therethrough;

wherein the gas-charged regulator and the spring-loaded regulator are configured to direct the fluid to the second outlet.

24. The multi-stage back pressure regulator of claim 23 wherein the gas-charged regulator and the spring-loaded regulator are passive devices configured such that they do not regulate pressure when the fluid pressure at the inlet is greater than a threshold pressure level.

* * * * *